United States Patent [19]

Hughes

[11] 4,450,548
[45] May 22, 1984

[54] DISC RECORD PLAYER HAVING STYLUS CLEANER

[75] Inventor: Larry M. Hughes, Indianapolis, Ind.

[73] Assignee: RCA Corporation, New York, N.Y.

[21] Appl. No.: 426,008

[22] Filed: Sep. 28, 1982

[51] Int. Cl.³ .............................................. G11B 3/58
[52] U.S. Cl. ..................................................... 369/71
[58] Field of Search .......................................... 369/71

[56] References Cited

U.S. PATENT DOCUMENTS

| | | | |
|---|---|---|---|
| 3,881,734 | 5/1975 | Leedom | 274/1 |
| 4,046,384 | 9/1977 | Kirschner | 274/47 |
| 4,166,623 | 9/1979 | Nanbu et al. | 274/1 |
| 4,285,524 | 8/1981 | Hughes et al. | 369/71 |

Primary Examiner—Steven L. Stephan
Attorney, Agent, or Firm—E. M. Whitacre; W. H. Meise; D. A. Kulkarni

[57] ABSTRACT

The stylus cleaner includes a stylus wiping pad holder mounted for motion along a path which is angularly disposed with respect to the carriage path. The location of the holder path is such that the stylus arm carriage engages the holder to drive it away from the record, against the force of a spring, as the carriage is driven toward an off-record rest position. The holder, carrying a stylus wiping pad, follows the carriage as it heads toward the record for playback. A stylus lifting/lowering apparatus located in the carriage is momentarily activated to cause engagement between the stylus with the wiping pad at points beyond the periphery of the record to effect stylus cleaning as the carriage is heading away from the off-record rest position.

8 Claims, 6 Drawing Figures

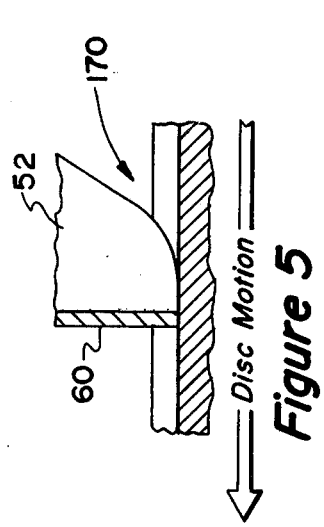
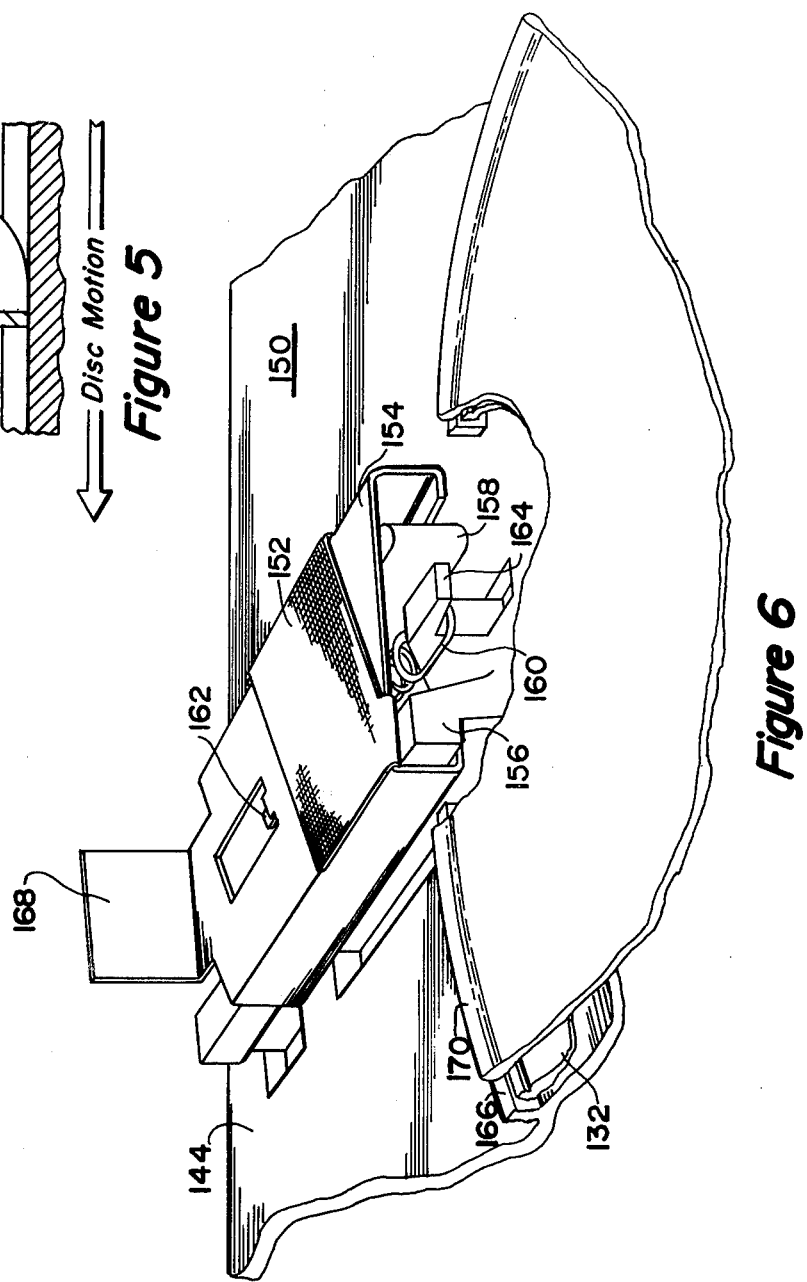

DISC RECORD PLAYER HAVING STYLUS CLEANER

The present invention generally relates to a record player and, more particularly, to a system for automatically cleaning a reproducing stylus of a record player.

There are several applications where it is desirable to automatically clean the stylus tip to get rid of accumulated dust and debris which might owerwise obscure the desired signal recovery. Such applications may arise in the context of audio and audio-video systems for recovering information recorded on a disc record medium.

One such application is the capacitive type video disc system. Here, audio and video information is recorded as geometric variations in a spiral information track on a disc record having conductive properties. An electrode is mounted on the pickup stylus. A variable capacitance is formed between the stylus electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 issued to J. K. Clemens.

In the video disc systems, the information track density is generally quite high. For example, one commercially available system uses a spirally-grooved information track with a groove density of nearly 10,000 grooves per inch. During playback, the stylus tip is received in the groove and guided toward the record center as a turntable-supported record revolves at the desired speed. The microscopic groove geometries require a stylus that has rather fine dimensions (e.g., stylus tip width = 2 micrometers, stylus tip depth = 5 micrometers and stylus tip height = 3 micrometers). It is generally the practice with such high density records (both grooved and flat records) to mount the signal recovery stylus in a protective cartridge which, in turn, is installed in a translatable carriage. The bottom wall of the carriage has an elongated opening through which the stylus extends out of the confines of the carriage for record engagement. The carriage is driven to cause it to follow the radially inward motion of the groove-guided stylus. Typically, a mechanism to lift and lower the stylus to effect stylus/record disengagement and engagement is located in the carriage. See, for example, U.S. Pat. No. 4,266,785 which issued to T. W. Burrus on May 15, 1981.

It is also known that the signal-to-noise ratio, or, more generally, the quality of the recovered signal is affected by such things as microscopic dust and debris adhering to the pickup stylus. The dust referred to here can come from the atmosphere. The debris, on the other hand, can come out of the information track as the stylus rides in the record groove.

In U.S. Pat. No. 4,285,524, which issued to this inventor on Aug. 25, 1981, a system is disclosed for cleaning a reproducing stylus each time a record is recovered from the player. As described in Hughes et al., each time an empty protective cover is inserted in the player and subsequently withdrawn with the record enclosed, the stylus is momentarily lowered and a pad swings by the lowered stylus to wipe off any dust or debris.

The present invention attempts to achieve the desirable results of the aforesaid invention in a much simpler and less costly manner. In accordance with this invention, the stylus cleaner includes a wiping pad installed on a holder, which is mounted in the player for motion along a path that is angularly disposed in respect of the carriage path. The location of the holder path is such that the stylus carriage engages the holder to push the wiping pad along the angular path as the carriage moves away from the turntable. A spring attached to the holder causes the wiping pad to follow the carriage toward the turntable to an intermediate position. The stylus lifter is selectively energized to gently lower the stylus onto the wiping pad while it is in motion to clean the stylus tip.

In the drawings:

FIG. 5 illustrates the stylus/record interface; and

FIG. 6 depicts an enlarged perspective view of the instant stylus cleaner.

Figure 1:
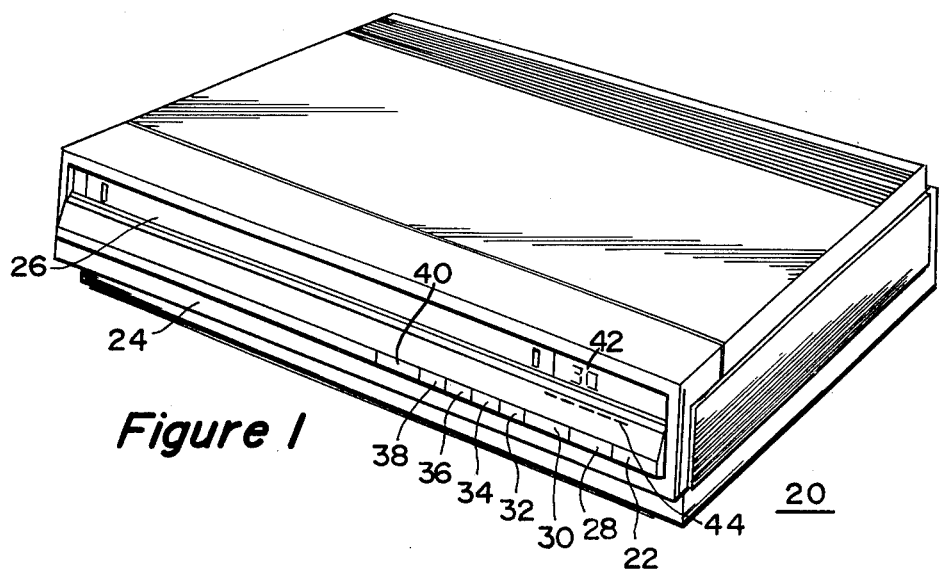
FIG. 1 is a perspective view of a video disc palyer utilizing the stylus cleaner of the present invention.

Shown in FIG. 1 is a video disc player 20 incorporting the present stylus cleaning mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., rapid access (forward/reverse) and visual search (forward/reverse)— to enable the viewer to quickly locate a precise section of the prerecorded program. During rapid access, the stylus is lifted away from the record, and rapidly moved sideways. In visual search, the stylus is rapidly moved across the record while in engagement therewith. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
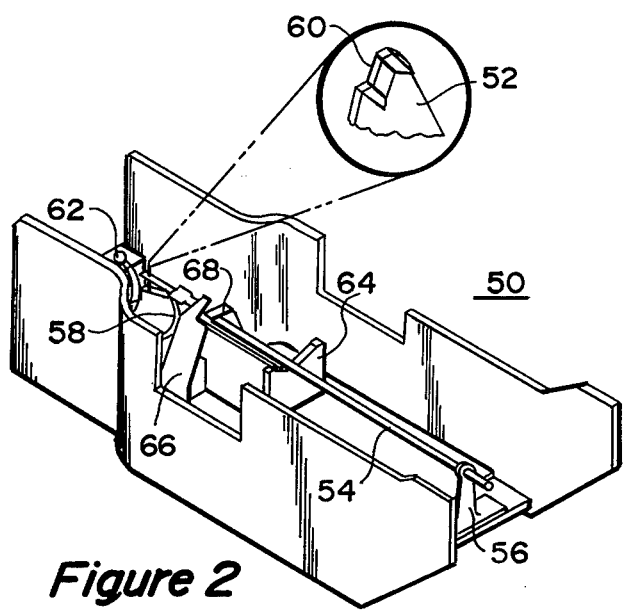
FIG. 2 illustrates a perspective view of a stylus cartridge suitable for use with the subject invention, and shown in an inverted position to illustrate the construction details.

FIG. 2 is a perspective view of a stylus cartridge 50, shown upside-down to reveal its construction. The cartridge 50 comprises a stylus 52 firmly secured at one end of an elongated, tubular stylus arm 54. The other end of the stylus arm 54 is flexibly suspended in the cartridge enclosure by a thin complaint suspension 56. The stylus tip is about 2 micrometers wide and 5 micrometers deep. The stylus arm 54 is in the form of a hollow aluminum tube with the following dimensions: length=1.654 inches, outside diameter=0.044 inches and inside diameter=0.040 inches. A leaf spring or flylead 58 is connected at one end to a thin electrode 60 on the stylus 52. The end of the stylus electrode 60 is about 2 micrometers wide by 0.2 micrometers thick. The other end of the flylead 58 is connected to a terminal 62 disposed on the cartridge body. The flylead 58 provides the stylus/record engagement force, and also serves as the electrical connection between the stylus electrode 60 and the pickup circuitry located within the carriage arm. The stylus arm 54 is held back, within the confines of the cartridge housing, against a stop 64 by a set of retaining fingers 66 and 68. When the cartridge 50 is installed in the player, the retaining springs 66 and 68 are automatically spread apart to release the stylus arm 54.

Figure 3:
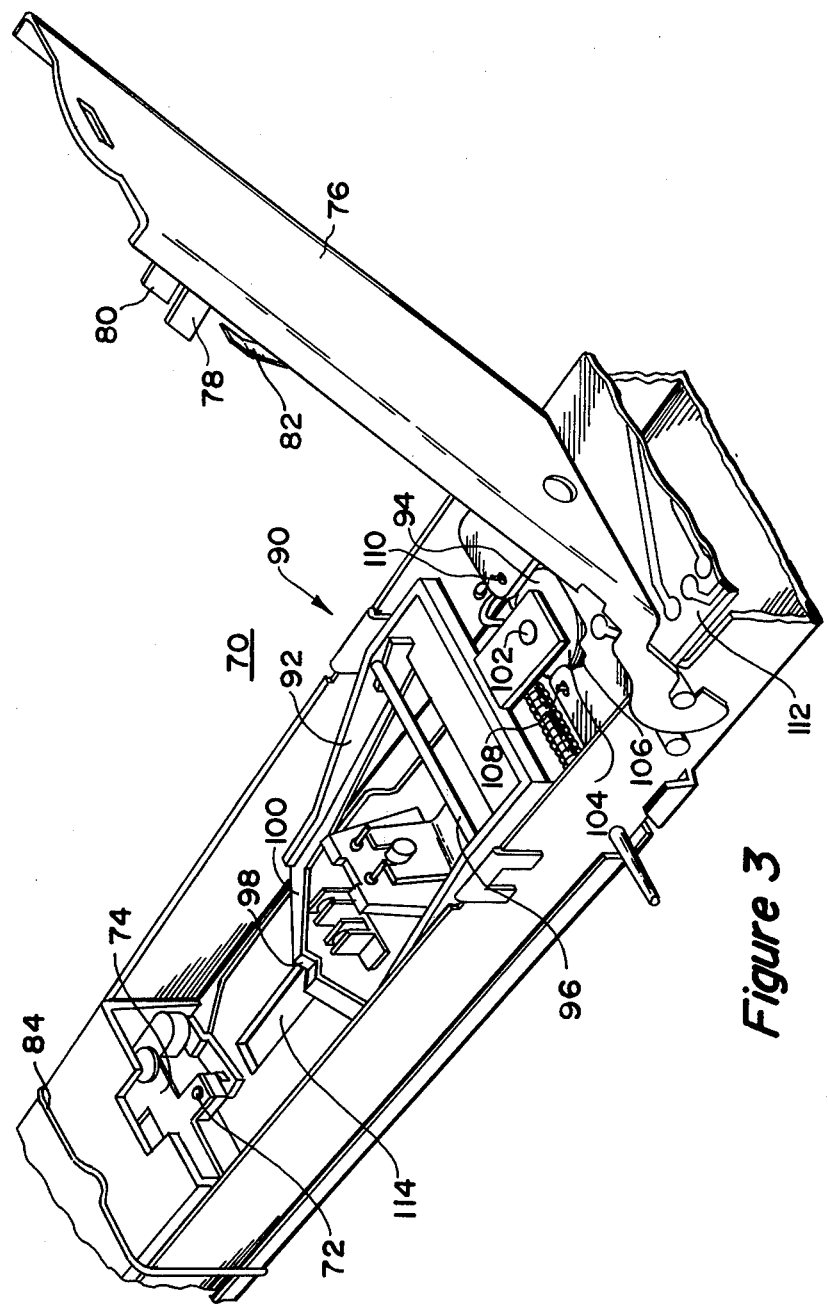
FIG. 3 represents an isometric view of a carriage translatably mounted in the player of FIG. 1 for housing the FIG. 3 pickup cartridge.

The stylus cartridge 50 is installed in a carriage 70 shown in FIG. 3. The carriage 70 is translatably mounted in the player in the fashion described later. The terminal 62 disposed on the cartridge case engages an input terminal 72 of the pickup electronics 74 housed in the carriage 70 upon reception of the cartridge therein. The carriage lid 76 is fitted with a pair of depending tabs 78 and 80, which engage and spread apart the stylus arm retaining springs 66 and 68 to free the stylus arm 54 when the carriage lid is closed. A leaf spring 82 arranged on the underside of the carriage lid 76 holds the cartridge 50 in place. A wire hoop 84 is provided to lock the carriage lid 76.

The carriage 70 is further equipped with a stylus lifting/lowering device 90 comprising a pivotally-mounted, stylus arm bracket 92 and a selectively-actuated electromagnet 94. The stylus arm bracket 92 is swingably mounted in the carriage 70 about a cross rod 96. When the cartridge 50 is positioned in the carriage 70 and the lid 76 is locked shut, the stylus arm 54 comes to rest in a raised position in a centering groove 98 provided on the cross member 100 of the stylus arm bracket 92. Depending downwardly from the other side of the stylus arm bracket 92, and fixedly secured thereto, is a permanent magnet 102. The permanent magnet 102 has a portion extending into an air gap defined by a non-magnetic core 104 of the electromagnet 94. Disposed about the core 104 is an electrical winding 106 having a pair of terminals 108 and 110 connected to an energization means 112. In the normal condition— i.e., in the absence of signals applied to the electromagnet 94—, the distribution of the weight of the stylus arm bracket 92 is such that the stylus arm 54 is held in the lifted position. When an appropriate signal is applied to the terminals 108 and 110, the bracket-mounted magnet 102 is repelled out of the air gap of the electromagnet to slowly set the stylus 52 down. The energization means 112, when actuated, applies a particular form of signal to the electromagnetic device 90 to assure a gentle stylus set down. The bottom wall of the carriage 70 has an elongated opening 114 to permit the stylus 52 to pass out of the confines of the carriage when the stylus lifting/lowering mechanism 90 is activated.

As will be evident from the brief description of the operation of the video disc player, there are several modes of operation in which the stylus 52 is lowered or lifted. For example, the stylus lifting/lowering device 90 is activated to lower the stylus 52 on a turntable-supported disc for playback, or on a wiping pad for cleaning the stylus tip. The signals are removed from the terminals 108 and 110 of the electromagnet coil 106 to raise the stylus 52 back up into the carriage 70 when the player is set in the PAUSE or RAPID ACCESS or OFF modes.

Figure 4:
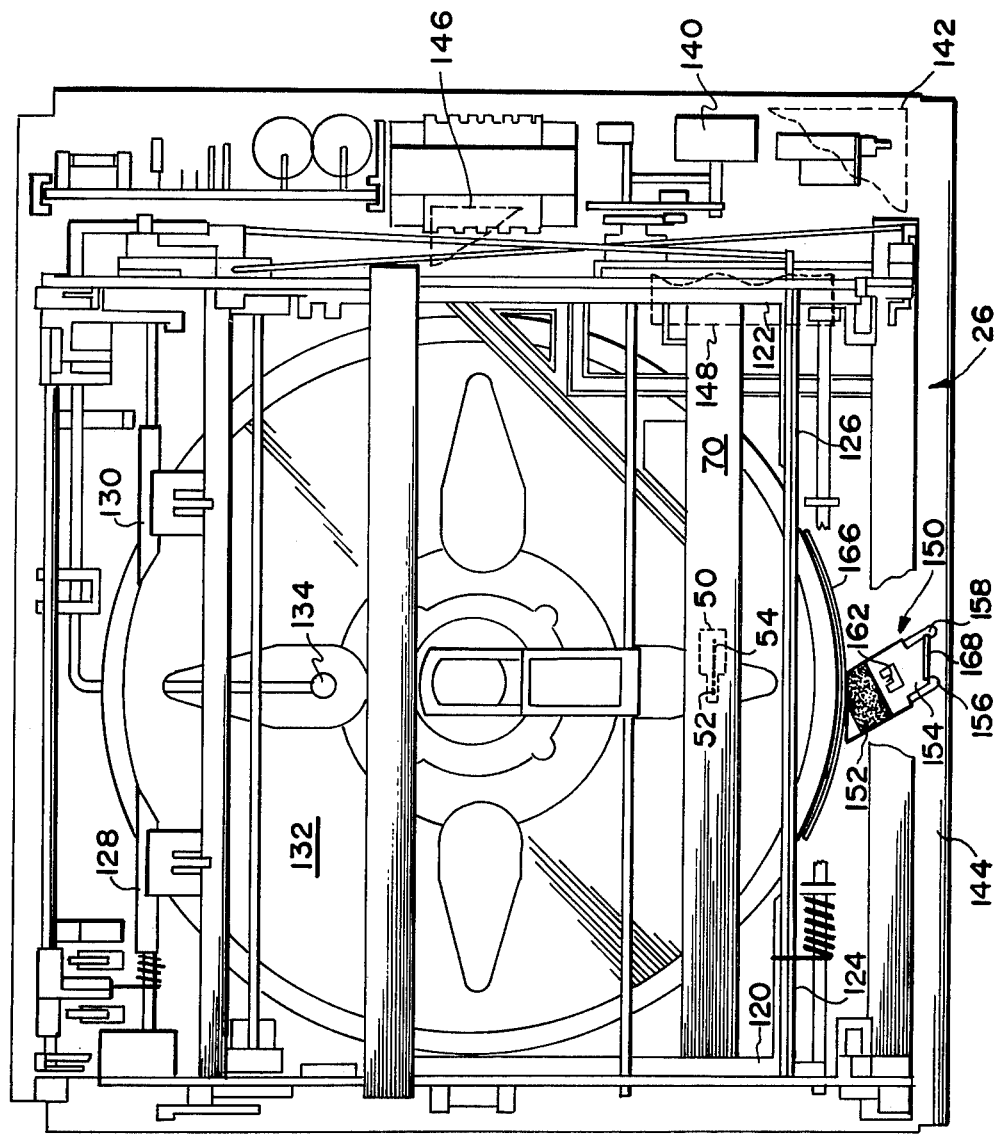
FIG. 4 shows a top view of the video disc player of FIG. 1 with its cover removed to show the underlying details.

Referring to FIG. 4, the pickup carriage 70 is mounted in the player for motion between an off-record rest position and an on-record, end-of-play position along a path defined by a pair of guide rails 120 and 122. A record is loaded into the player by inserting a full caddy into the player. Upon extraction of the empty sleeve from the player, the enclosed record is left therein resting on a set of receiving pads 124, 126, 128 and 130. The retained record is automatically transferred to a rotatable turntable 132 by a record transfer mechanism including a record handling finger 134. A motor located underneath the turntable 132 drives it to rotate at the desired speed (e.g., 450 rpm). U.S. patent application, Ser. No. 374,377, filed for Hughes, and entitled "DISC PLAYER HAVING RECORD HANDLING APPARATUS", describes a suitable record extraction and transfer mechanism.

A stepper motor 140 drives the carriage 70 from the off-record rest position to a starting position over the turntable-supported record, and the stylus arm lifting/lowering device 90 is energized to lower the stylus 52 onto the record. During playback, the carriage 70 is driven toward the record center so as to cause it to track the radially-inward motion of the stylus 52. The signals at the output of the reproducing stylus 52 are processed by the pickup circuits 74 housed in the carriage 70, and fed to signal processing circuitry disposed on the signal board 142 attached to the player center-plate 144. The signal processing circuitry converts the signals at the output of the pickup circuits 74 into a form suitable for application to a conventional television receiver. When the carriage 70 reaches the end-of-play position, the stylus 52 is raised and the carriage is driven back until it operates a microswitch to reset it at its off-record home position. The record is automatically transferred back to the record receiving pads 124, 126, 128 and 130. The record is then retrieved from the player by inserting an empty sleeve into the player and withdrawing it therefrom.

Disposed on the signal board 142 are two microcomputers—a mechanism microcomputer 146 and a player control microcomputer 148. The mechanism microcomputer 146 is responsible for sequencing and controlling the caddy loading/unloading mechanism, record transfer mechanism and turntable drive mechanism. The player control microcomputer 148 has the responsibility for sequencing and controlling the carriage drive mechanism, stylus lifting/lowering mechanism and other player control functions.

During playback, the stylus 52 encounters groove defects which have a tendency to abrade the stylus and the stylus electrode. To protect the delicate stylus electrode 60 (0.2×2.0 micrometers) from damage, it is desirable to locate it on the trailing face of the stylus body. In other words, the motion of a turntable-mounted record 170 is such that the portion of the record beneath the stylus 52 encounters the stylus electrode 60 last in the manner depicted in FIG. 5.

The subject video disc player is provided with a stylus cleaning mechanism 150, illustrated in FIG. 6, in accordance with the principles of the present invention. The stylus cleaning mechanism 150 includes a wiping element 152 affixed to a holder 154 which is slidably mounted for motion along a path defined by a pair of guide tracks 156 and 158. The guide tracks 156 and 158 are disposed angularly with respect to the front-to-back carriage path in the manner indicated in FIG. 4. The cleaning element 152 can be made from any suitable material like velvet, Butyl, or RTV rubber, etc. A return spring 160, having its ends secured to a hook 162 on the holder 154 and a post 164 on the player housing 144, biases the holder against an arcuate stop 166. As the carriage 70 is translated to its off-record rest position near the front end of the player, it engages an upstanding, turned-up portion 168 of the holder 154, and drives it away from the record center along the aforesaid angular path. The reset spring 160 causes the holder 154 to follow the carriage 70 when it is driven toward the record center for playback until the holder engages the arcuate stop 166.

The player control microcomputer 148 coordinates the activities of the carriage drive motor 140 and the stylus lifting/lowering device 90 to effect stylus cleaning as the carriage 70 is driven toward a turntable-supported record 170 for playback. The control microcomputer 148 issues pulses to the stepper motor 140 until the carriage 70 is advanced to an intermediate point (about 0.30 inches in from the home position) between the home position and a startup position over the record (approximately 1.20 inches inward from the home position). At this point, the stylus lifting/lowering device 90 is energized to lower the stylus 52 onto the stylus wiping pad 152.

The player control microcomputer 148 waits for approximately 1.5 seconds to allow the stylus 52 to come to rest on the stylus cleaning pad 152, and then resumes the carriage drive. As the carriage 70 advances toward the record 172, the cleaning element 152 wipes the stylus tip to rid it from any dust and debris buildup. After the carriage 70 advances another 0.25 inches, the microcomputer 148 sends a command to the stylus lifting/lowering device 90 to raise the stylus 52. When the carriage 70 activates a landing switch, the microcomputer 148 energizes the stylus lifting/lowering device 90 to gently lower the stylus 52 on the record 172 for playback.

When the stylus 52 reaches its end-of-play position, the player control microcomputer 148 lifts the stylus up, and sends the carriage 70 to its rest position.

To protect the delicate stylus electrode 60 (0.2×2.0 micrometers) during playback, the record is rotated such that the portion of the record beneath the stylus shoe sees the electrode last as previously indicated. Similarly, to protect the stylus electrode 60 during stylus cleaning, it is desirable to wipe the stylus 52 such that the portion of the wiping pad 152 underneath the stylus moves toward the electrode. To this end, the guide tracks 156 and 158 of the wiping pad holder 154 are angularly oriented with respect to the carriage path in the manner more clearly shown in FIG. 4.

Several variations of the subject stylus cleaner mechanism 150 are possible. The stylus lifting/lowering device 90 can be actuated when the carriage 70 is heading toward the rest position (instead of away from it), so that the stylus cleaning operation is carried out each time the carriage is reset at the rest position. In that case, the angular orientation of the guide tracks 156 and 158 will be the opposite from the orientation shown in FIG. 4—i.e., the guide tracks will be inclined to the right in FIG. 4 rather than to the left as shown therein.

An advantage of the angular orientation of the guide tracks 156 and 158 is that the bending forces exerted by the wiping pad 152 on the stylus arm 54 during stylus cleaning is only a component of the stylus/wiping pad frictional force. The angular arrangement of the guide tarcks 156 and 158, thus, protects the delicate stylus arm 54 (wall thickness 0.004 inches) from undue bending forces.

What is claimed is:

1. In a record player including a pickup stylus subject to engagement with a turntable-supported record for recovering prerecorded information disposed thereon during playback; said stylus being mounted at one end of a stylus arm having the other end yieldably supported in a carriage which is subject to translatory motion along a first path between an off-record rest position and playback positions over said record; said player further having means mounted in said carriage for lifting and lowering said stylus in a manner causing said stylus to protrude from said carriage to effect engagement and disengagement of said stylus with a record disposed on said turntable; stylus cleaning apparatus comprising:
   (A) a cleaning element;
   (B) a holder carrying said cleaning element;
   (C) means for mounting said holder for motion along a second path such that said carriage engages said holder to cause displacement of said cleaning element along said second path away from the center of said turntable during translation of said carriage toward said rest position;
   (D) means for causing displacement of said cleaning element along said second path toward said turntable center during translation of said carriage away from said rest position; and
   (E) means for selectively energizing said stylus lifting/lowering means to cause engagement of said stylus with said cleaning element at points beyond the periphery of a turntable-supported record to effect cleaning of said stylus during travel of said carriage between said rest position and an intermediate position between said rest position and said playback positions, and while said cleaning element is in motion along said second path.

2. The stylus cleaning apparatus as outlined in claim 1 wherein said path of said holder is angularly disposed in respect of said carriage path.

3. The stylus cleaning apparatus as defined in claim 1 wherein said displacement causing means comprises a spring biasing said holder toward said turntable center.

4. The stylus cleaning apparatus of claim 3 further including a stop subject to engagement with said holder during motion of said carriage toward said turntable center for limiting the inward stroke of said cleaning element.

5. The stylus cleaning apparatus as set forth in claim 1 wherein said selectively energizing means causes engagement between said stylus and said cleaning element when said carriage is moving toward said rest position.

6. The stylus cleaning apparatus as formed in claim 1 wherein said selectively energizing means causes cleaning element/stylus engagement as said carriage is heading away from said rest position.

7. The stylus cleaning apparatus of claim 1 wherein said selectively energizing means causes-cleaning of said stylus during the occurence of each passage of said carriage between said rest position and said intermediate position.

8. The stylus cleaning apparatus as defined in claim 1 wherein said holder mounting means comprises a pair of tracks disposed at an angle to said carriage path.

* * * * *